(12) United States Patent
Narayanaswamy et al.

(10) Patent No.: US 7,069,553 B2
(45) Date of Patent: Jun. 27, 2006

(54) UNIVERSAL DEPLOYMENT TOOL

(75) Inventors: Sreedhara Srinivasulu Narayanaswamy, Plano, TX (US); Gerald L. Boyd, Trenton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 241 days.

(21) Appl. No.: 10/378,503

(22) Filed: Mar. 3, 2003

(65) Prior Publication Data

US 2004/0177352 A1   Sep. 9, 2004

(51) Int. Cl.
*G06F 9/445* (2006.01)
(52) U.S. Cl. .................. 717/173; 717/178
(58) Field of Classification Search ........... 717/100, 717/171, 177, 148, 173, 178; 709/221, 222; 705/51; 707/200; 713/191, 150, 189, 194
See application file for complete search history.

(56) References Cited

U.S. PATENT DOCUMENTS

| | | | | |
|---|---|---|---|---|
| 5,613,159 | A * | 3/1997 | Colnot | 710/11 |
| 5,644,364 | A * | 7/1997 | Kurtze et al. | 348/584 |
| 5,654,737 | A * | 8/1997 | Der et al. | 345/634 |
| 5,903,261 | A * | 5/1999 | Walsh et al. | 715/500.1 |
| 5,929,836 | A * | 7/1999 | Der et al. | 345/629 |
| 5,974,454 | A * | 10/1999 | Apfel et al. | 709/221 |
| 6,009,401 | A * | 12/1999 | Horstmann | 705/1 |
| 6,014,651 | A * | 1/2000 | Crawford | 705/400 |
| 6,067,044 | A * | 5/2000 | Whelan et al. | 342/357.07 |
| 6,175,562 | B1 * | 1/2001 | Cave | 370/352 |
| 6,216,152 | B1 * | 4/2001 | Wong et al. | 709/203 |
| 6,233,291 | B1 * | 5/2001 | Shukhman et al. | 375/341 |
| 6,233,567 | B1 * | 5/2001 | Cohen | 705/59 |
| 6,304,967 | B1 * | 10/2001 | Braddy | 713/150 |
| 6,314,565 | B1 * | 11/2001 | Kenner et al. | 717/171 |
| 6,334,189 | B1 * | 12/2001 | Granger et al. | 713/200 |
| 6,343,280 | B1 * | 1/2002 | Clark | 705/55 |
| 6,357,047 | B1 * | 3/2002 | Kurtze et al. | 725/151 |
| 6,480,959 | B1 * | 11/2002 | Granger et al. | 713/189 |
| 6,498,791 | B1 * | 12/2002 | Pickett et al. | 370/353 |
| 6,499,035 | B1 * | 12/2002 | Sobeski | 707/103 R |
| 6,505,160 | B1 * | 1/2003 | Levy et al. | 704/270 |
| 6,508,709 | B1 * | 1/2003 | Karmarkar | 463/42 |
| 6,526,097 | B1 * | 2/2003 | Sethuraman et al. | 375/240.2 |
| 6,557,100 | B1 * | 4/2003 | Knutson | 713/100 |
| 6,614,786 | B1 * | 9/2003 | Byers | 370/353 |
| 6,628,644 | B1 * | 9/2003 | Nelson et al. | 370/352 |
| 6,636,506 | B1 * | 10/2003 | Fan | 370/356 |
| 6,679,177 | B1 * | 1/2004 | Wu et al. | 102/377 |
| 6,684,387 | B1 * | 1/2004 | Acker et al. | 717/126 |
| 6,757,689 | B1 * | 6/2004 | Battas et al. | 707/101 |
| 6,826,716 | B1 * | 11/2004 | Mason | 714/38 |

OTHER PUBLICATIONS

BEA WebLogic Server Assembling and Configuring Web Applications, BEA, Relase 7.0 Aug. 20, 2002, whole manual.*
Dynamic Hardware Plugins in a FPGA with PArtial Run-Time Reconfiguration, Edison L. Horta et al, ACM, 2002 pp. 343-348.*

(Continued)

*Primary Examiner*—Todd Ingberg
(74) *Attorney, Agent, or Firm*—Baker Botts L.L.P.

(57) ABSTRACT

A system and method for a deployment tool is provided. The deployment tool in one aspect assembles and deploys software components generated by any predetermined standard compliant application tools. The system and method in one aspect isolates each application server's specific deployment logic into plug-in modules. A user is provided with a series of input tools or panels for specifying deployment variables and customizing the deployment as needed. The customization includes the ability to select the target application server and optionally, the target platform and operating system.

20 Claims, 13 Drawing Sheets

OTHER PUBLICATIONS

Software Configuration, Distribution, and Deployment of Web-Services, Rainer Anzbock et al, ACM, Jul. 15, 2002, pp. 649-656.*

Genuitec Announces WebLogic Plugins for WebSphere Aplication Developer, <http://www.genuitec.com/news/2002/NewsWSAD20020705.htm>, Jul. 5, 2002, genuitec web site 1 page.*

IBM, "Enterprise JAVABEANS Development Using VisualAge for JAVA", IBM Redbooks, SG24-5429-00, Jun. 1999.*

Development of a WWW Server Management Support System, Yutaka Nakamura et al, IEEE, 2002, pp. 1-8.*

Scalable Web Server Architectures, Antoine Mourad et al, IEEE, 1997, pp. 12-16.*

* cited by examiner

UNIVERSAL DEPLOYMENT TOOL

TECHNICAL FIELD

The present application relates to computer systems, and particularly, to a system and method for assembling and deploying software components to a target server or platform.

BACKGROUND

Middle tier applications, also referred to as application servers, typically sit on top of a wide range of existing enterprise systems such as database management systems, transaction monitors, and naming and directory services. Many of these application servers are built based on standard specifications such as the Java 2 Platform, Enterprise Edition (J2EE) to provide portability and scalability to applications managing and accessing various enterprise systems.

J2EE, for example, defines a specification for developing enterprise applications to follow as a standard. J2EE bases the enterprise applications on standardized, modular components, by providing a set of services to those components, and by handling many details of application behavior automatically. J2EE includes support for Enterprise JavaBeans (EJB) components, Java Servlets API, JavaServer Pages and Extended Marked-up Language (XML) technology.

Accordingly, an application built conforming to the J2EE standard specification may be deployed to an application server that supports the J2EE standards, thus allowing the deployed application to manage and access various resources provided by the underlying enterprise systems via the application server. Briefly, deployment is the process of distributing and configuring various part of application programs such as J2EE applications to appropriate locations in application servers.

Although J2EE provides standard specifications for application servers and applications running on these application servers, each application must be deployed according to vendor or application server provider's specific criteria. In most cases, each vendor supplying the application server also provides deployment methods and tools for deploying applications to its application server specifically. Further, applications developed in a particular application server development environment are limited to deploying to that application server only. Thus, to deploy applications to different application servers, multiple development environment tools may need to be used to develop the applications for deploying.

Different deployment methods for different application servers mean that users need to learn multiple methods of deployment and keep up with numerous and changing deployment tools provided by different application server providers. Similarly, users need to learn and use multiple development environment tools for developing the applications for deployment. Accordingly, what is needed is a universal deployment tool that would allow a user to deploy applications and components built using any development environment tools to be assembled and deployed to any other application server.

SUMMARY

A system and method for a deployment tool is provided. The deployment tool in one aspect assembles and deploys program modules or software components generated by any predetermined standard compliant application tools. The system and method in one aspect isolates each application server's specific deployment logic into plug-in modules. A user is provided with a series of input tools or panels for specifying deployment variables and customizing the deployment as needed. The customization includes the ability to select the target application server and optionally, the target platform and operating system. The system and method provided may be run in a standalone mode and/or may be integrated into a development tool from which it may be started.

In one aspect, the system comprises a deployment module operable to determine a target application server to which to deploy one or more program modules. The system also includes a common set of program definitions for a plug-in module to implement for interacting with the deployment module. The common set of program definitions are used by the plug-in module and the deployment module to configure target application server specific information for deploying to the target application server. The common set of program definitions may include object-oriented interface definitions defining methods and variables, which the plug-in module may implement for customizing the plug-in for the particular target application server.

In another aspect, the system may provide one or more plug-in modules. For example, the system may provide a plug-in module corresponding to each target application server that the system may support. The plug-in modules implement the common set of program definitions, providing customization related to target application server specific configurations for the associated target application server.

Yet in another aspect, a method for deploying program modules or files comprises determining a target application server to deploy one or more program modules and dynamically loading a plug-in module associated with the target application server for determining configuration information related to the target application server. Deployment files are updated with the determined configuration information and the program modules are repackaged with the updated deployment files. The repackaged file is then ready to be deployed to the target application server by invoking a deploy routine implemented in the plug-in. In one aspect, for those application servers that are located remotely from the system that is running the deployment tool of the present disclosure, the repackaged file is transferred to the target application server, for example, using the FTP (file transfer protocol), before the deploy routine is invoked.

Further features as well as the structure and operation of various embodiments are described in detail below with reference to the accompanying drawings. In the drawings, like reference numbers indicate identical or functionally similar elements.

DETAILED DESCRIPTION

The present disclosure describes a system and method for deploying software or program units, also referred to as program files or program modules to any middle tier applications or application servers complying with a predetermined specification standard. An example of such predetermined specification standard includes J2EE and an example of such software units includes components. Thus, for example, the system and method in the present disclosure provides an ability to deploy Enterprise JavaBeans (EJBs), web applications, and servlets, etc. to various application servers. Deployable EJBs may include stateless session beans, stateful session beans, bean managed persistence entity beans, container managed persistence entity beans, message driven beans and web components or applications, but not limited to only such components.

Thus, for example, the system and method provided in the present disclosure enables deployment to J2EE 1.3 Reference Implementation and application servers such as Weblogic, Websphere, iplanet, Jrun, Oracle9i, or any other application servers on platforms such as NT, Windows 2000, Solaris, AIX, HP, Linux, and AS/400.

In the following description, well-known functions and components are not described in detail. Thus, many known features and definitions related to J2EE standard specification and Java programming methods are not described in detail. Further, although the system and method disclosed is described with reference to J2EE and Java environment, this standard specification is used as an example only. Thus, it should be understood that the system and method for a deployment tool disclosed herein are not limited to use with J2EE and Java applications only, but may also apply to other such standards and specifications.

Figure 1:
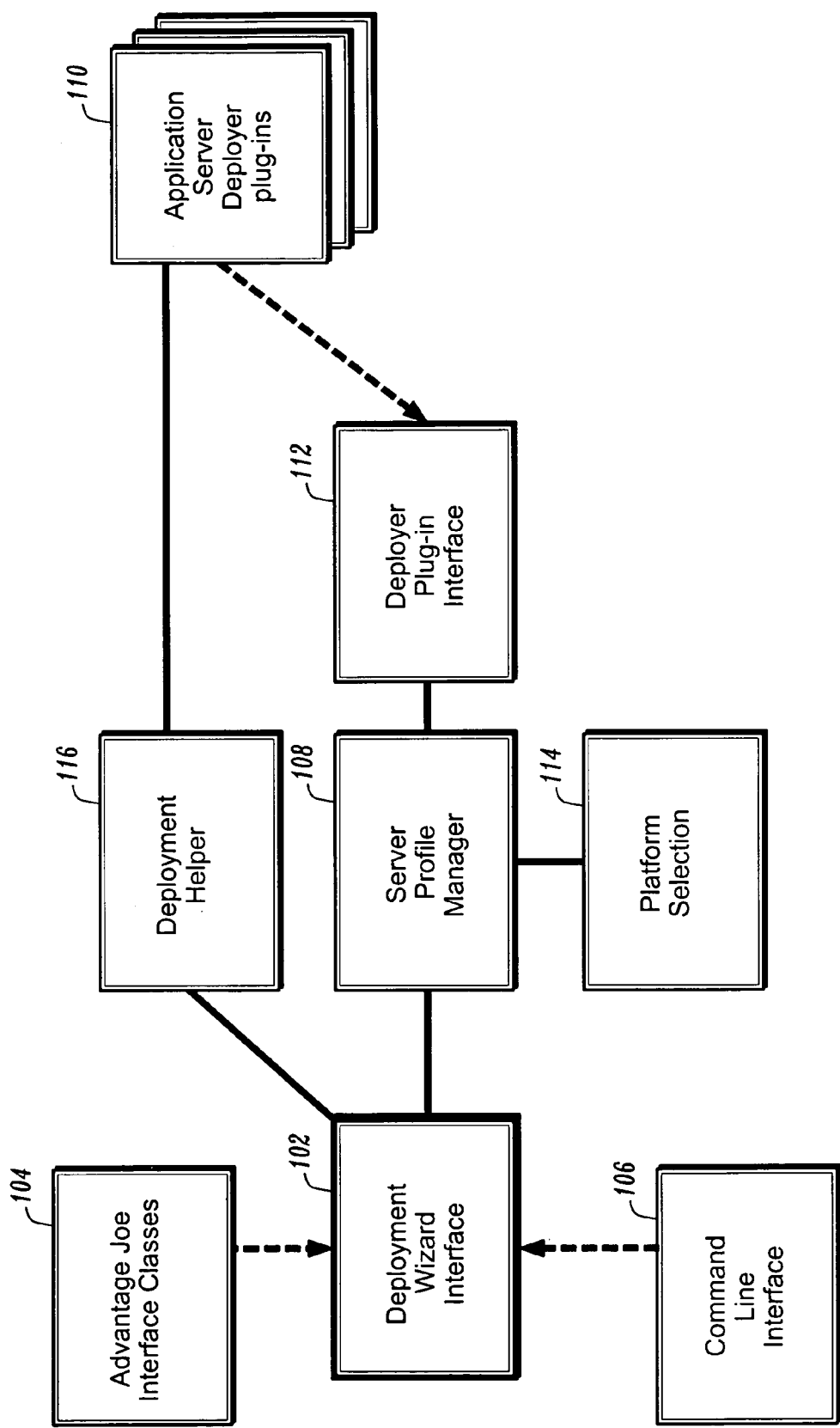
FIG. 1 is an architectural diagram illustrating the deployment tool in one embodiment.

FIG. 1 is an architectural diagram illustrating the system and method for a deployment tool of the present disclosure in one embodiment. The deployment tool of the present disclosure implements a deployment wizard interface 102 and is invoked to begin deploying various application components to an application server. A deployment wizard interface 102 includes a functionality to present a user with various input panels and message panels to guide the user through the deployment process. Alternatively, deployment wizard interface 102 may be invoked on a command line interface and the user may run the deployment process without any presentation panels.

Deployment wizard interface 102 defines a number of methods and variables that may be implemented to use the deployment tool. For example, deployment tool classes may implement the following deployment wizard methods to provide its functionalities. getDeploymentModules( ), which returns a list of EAR files to be deployed; setDeployer, which sets the deployer for the active deployment plugin; getDeployer, which returns the deployer for an active deployment plugin; getHelper, which returns the deployment helper interface; isstopped, which returns true if the deployment has been stopped; packageFiles, which packages the EAR files to be deployed; processFinish, whish is executed when the finish button is pressed; getPluginBundle, which returns the resource bundle being used by the active plugin; getBundle( ), which returns the bundle being used by the deployment wizard; isXmlEditorAllowed, which returns true if the XML editor can be invoked; isRunningInsidejoe, which returns true if the deploy tool has been invoked by Advantage Joe, a development environment; getContextRoot, which gets the context root for the project; getEjbRefs, which gets ejb references for a war or a project; setContextRoots, which sets the context root HashMap using the context root settings from application-.xml files in the ear file; showSunJ2eeRi( ), which returns true if the sun-j2ee-ri.xml file is to be shown in the ejb tree.

In one embodiment, two classes implement the deployment wizard interface 102. One class 104 communicates with a development environment tool interface 104, such as the Advantage Joe interface, and may be invoked within the development environment tool. The other class 106 receives input from a command line and is referred to as a command line interface.

The deployment tool of the present disclosure uses a plug-in architecture to isolate and modularize application specific functionalities and properties unique to each application server. Examples of the unique functionalities and properties may include application server specific security information and factors such as whether caching is to be performed. Other application server specific criteria include a particular location of an application server where the EAR file needs to be stored, whether an EAR file needs to be pre-processed to include application server required classes. Further, many application servers generally require that application server specific deployment descriptors be used.

Accordingly, application specific deployment configuration and functionalities for a given target application server are encapsulated into a plug-in module 110 for that target application. The plug-in modules 110 implement a plug-in deployer interfaces 112 and other helper interfaces to effect communication between the classes 104 106 that implement the deployment wizard interface 102.

In one embodiment, the classes 104 and 106, which implement the deployment wizard interface 102, requests a server profile selection to determine which server profile is to be used to deploy a specified package of components or applications such as the archive J2EE application (EAR) file. For example, one or more plug-ins that are currently installed are determined and used to form a list of available target servers. That is, if an IBM Websphere plug-in is installed, then the Server Profile Manager 108 returns IBM Websphere application server as one of the candidate target servers.

In one embodiment, a server profile panel is presented to a user to select a target server from a list of target servers determined as described above. A user may select one from the list or may specify a new target application server, creating a new server profile and installing a plug-in associated with the new server.

As known to those skilled in the art, a plug-in refers to an accessory program that enhances a main application. Plug-ins are program units that may be added to the main application without affecting the main application. Because the deployment tool of the present disclosure uses a plug-in architecture for application specific functionalities, additional target application servers may be added easily by, for example, adding plug-ins for those new target application servers. Accordingly, new application servers for deployment may be added dynamically without having to change or modify other parts of the deployment tool.

Typically, a deployer, that is, a person performing the deployment selects a server type and defines a server profile 108 that is used to save deployment settings. Server profile 108 may already have been created previously, for example, from a previous deployment session to the same application server. Server profiles 108 are created for servers that have corresponding plug-ins 110 that implement the deployer interface 112. For example, server profiles are created and saved by the server profile manager 108 and are populated with the information provided by the user during the deployment process. Server profiles store information needed by the plug-in, including such information as the profile name, host name, and the port number. Other information in a server profile may include the type of deployment platform, file transfer protocol ("ftp") user identifier ("id"), ftp password, and deployment directory. Additional information needed for a particular application server may be requested from the user during the deployment process and stored in the server profile.

Once a plug-in implements the deployer interface 112, the deployment tool class 104 or 106 may determine which platforms are supported by the plug-in by invoking an instance of the plug-in method that implements the deployer interface 112. For example, a class in the plug-in implementing an interface provided for communicating platform information to the deployment tool class 104 or 106, for instance, the MultiPlatformPlugin interface defininig getplatforms method, may provide a list of the platforms supported by that particular plug-in. After a platform is selected as shown at 114, a corresponding plug-in 110 is activated to package the EAR file.

A deployer helper interface 116 may be used by the plug-ins 110 and provides access to one or more methods for requesting services of the deployment tool classes 104 or 106 implementing the deployment wizard interface 116. For instance, after the EAR file is packaged, a user may edit the deployment descriptors using the deployer helper interface. The deployer helper interface 116 is passed to a plug-in, when the plug-in is activated by the deployment tool 104 or 106. Prior to displaying a summary page for a packaged EAR file, the deployment tool 104 or 106 may optionally display the contents of the packaged EAR file to be modified. The modifications may be performed using the helper interface dialogs or by using a provided XML editor.

Figure 2:
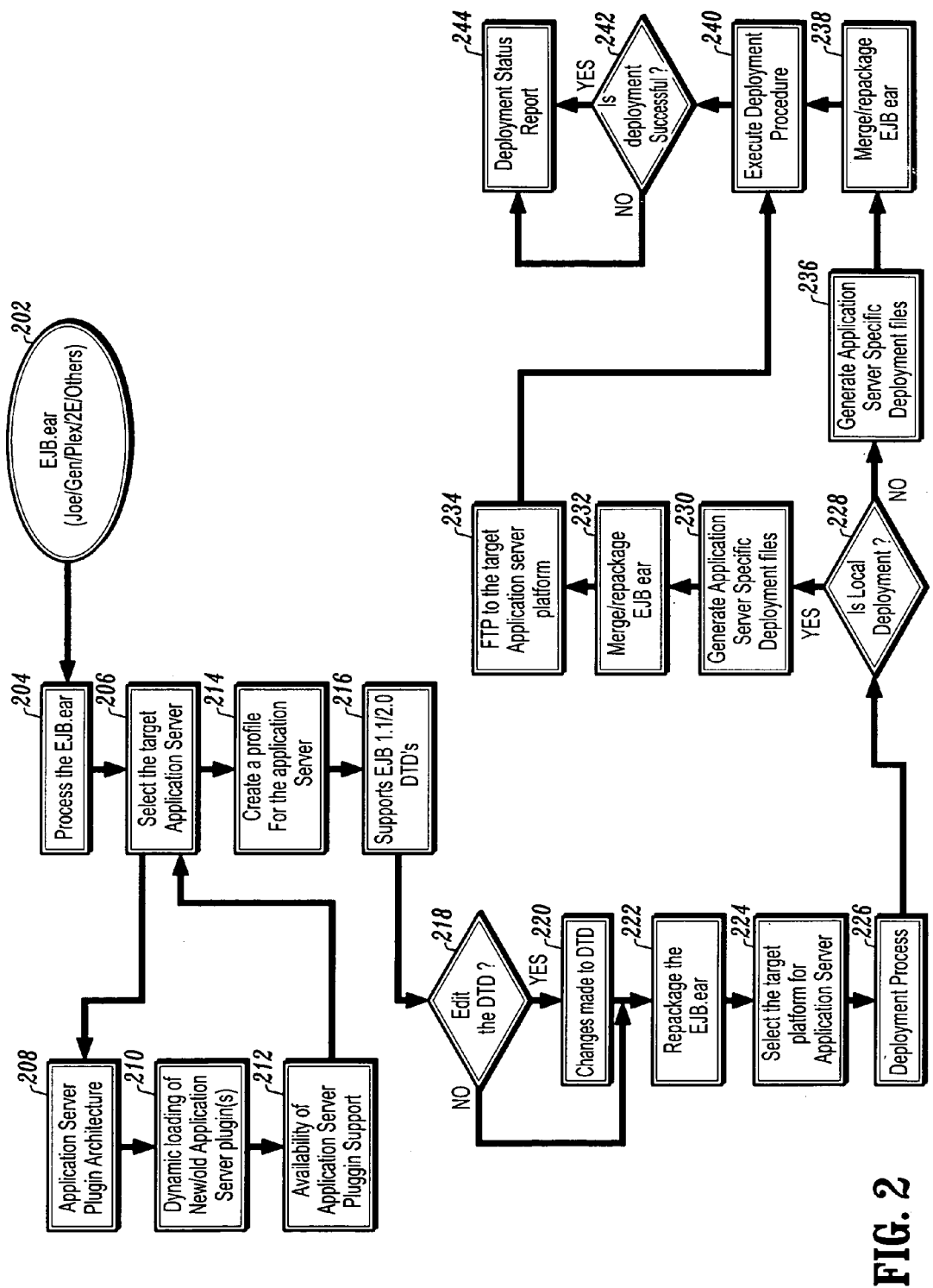
FIG. 2 is a functional diagram illustrating an overview of the deployment process in one embodiment.

The packaged EAR file is then deployed to the selected target application server using the deploy method implemented by the plug-ins. For instance, the deploy method may be invoked from the deployment tool classes 104, 106 that implement the deployment wizard interface 102 FIG. 2 illustrates an overview of a deployment process in one embodiment. Although FIG. 2 shows EJB.ear 202 as components that are being packaged and deployed, the deployment tool of the present disclosure is enabled to handle a complete EAR file, which may contain both the EJB and web application components, and other files. Deployable components may be created by using any one of the available enterprise development environment tools. One such tool is Advantage Joe 3.0, which provides capability for modeling, building, and deploying components onto an application server. The disclosed deployment tool, in one embodiment, combines the Java archives (JAR) files and incorporates them into Enterprise archive (EAR) files, which may then be deployed to a target application server; regardless of which tools were used to create the JAR files and EAR files.

JAR files typically include one or more J2EE modules making up a J2EE application. A J2EE module is a collection of one or more J2EE components of the same component type such as web and EJB. Each J2EE module typically includes a corresponding deployment descriptor that contains declarative data required during the deployment of the components in the module.

A J2EE application includes one or more J2EE modules and one J2EE application deployment descriptor. J2EE application deployment descriptor generally describes the WAR and EJB JAR files and includes security and database information specific to the application, if any. A J2EE application is packaged using the Java archive (JAR) file format into a file with ear filename extension. When composing a J2EE application, J2EE modules used in the application are selected, an application directory structure is created, J2EE module deployment descriptors are created, a deployment descriptor for the J2EE application is created, and the J2EE application is packaged.

Referring back to FIG. 2, the EAR file 202 received. Alternatively, a deployment tool of the present disclosure, may receive input in the form of module selection and model information, for example, if the deployment tool is being invoked as part of a development environment. That is, when operating as an integrated part of a development tool such as Advantage Joe, the deployment tool, in one embodiment, is supplied with development tool's information model, a directory of J2EE modules packaged in JAR files, and a project selection.

A development tool's information model may include detailed information about the application such as description of the classes and internal logic and relationships between the classes. A project selection may be used to build and deploy project related objects, for example, by selecting from a list of objects including classes, specifications, methods, parameters, projects, and jars. Accordingly, a project selection allows the deployment tool to locate the particular project output built using a development environment tool. This output may include an output directory containing classes resulting from the build process and also any applicable jar files created during the build process in the development environment tool. The deployment tool in the present disclosure uses the project selection information to access the development tool's information model and the output directory in order to package the J2EE modules into an EAR file 202.

At 204, input EAR file 202 is processed. For example, the EAR file 202 is expanded into its individual components so that one or more deployment descriptors in the EAR file 202 may be extracted and modified. The deployer interfaces provided in the present disclosure may be used to modify the deployment descriptors. For instance, although the supplied or constructed EAR files 202 contain deployment descriptors, these descriptors may need to be modified prior to the actual deployment to a target application server. As known to those skilled in the art, a deployment descriptor refers to an XML file provided for each module and application, and describes how the modules and applications are to be deployed.

At 206, a target application server to which the EAR file is to be deployed is selected. The selection may, for example, be determined by presenting the user with a list of available application servers that have corresponding plug-ins 208 and allowing the user to select an application server from the list. In addition, the user is given an option to enter a new application server not listed in the list. At 210, a plug-in corresponding to the selected application server is dynamically loaded. At 212, any other plug-ins that are available may also be dynamically loaded at this time. At 214, a profile is created for the selected application server if one does not exist already. For example, a new application server may need a corresponding application server profile created. This application server profile includes information such as the host name and the port number of the target application server to which the EAR files is being deployed. At 216, a validity check is performed to make sure that the EAR file includes a valid version of a deployment descriptor and conforms to valid data type definitions (DTD). As known to those skilled in the art, the deployment descriptors are XML files and, therefore, need to be associated with a valid document type declaration provided in a DTD. At 218, it is determined whether the DTD needs to be edited, and if so, at 220, appropriate changes are made to DTD.

For example, a user wanting to include any application server security tags for the deployment may edit the DTD file. At 222, the EAR file is repackaged. The repackaged EAR file may contain modified DTD FILE and descriptors. At 224, a target platform for the selected application server is selected. The selection may be determined, for example, by presenting a list of platforms that the selected application server runs on, and allowing the user to select a platform server from the list. The list of platforms supported by the selected application server is provided by the corresponding plug-in via, for example, the plug-in interface method implemented by the corresponding plug-in.

At 226, deployment process begins. The deployment process may begin, for example, if a user presses a finish button after having selected a platform from the list of the platform presented to the user. In this case, the user pressing the finish button, or performing any analogous activity to indicate that all customizations pertaining to the selected application server are complete, triggers a deploy method implemented by the plug-in to be invoked.

The following steps are processed within the plug-in. At 228, a determination is made as to whether the deployment is to take place to the local server or to a remote server connected by a network, by for example, examining the deployment properties listed in the deployment descriptors in the EAR file or the user inputs. If it is determined that the EAR file is being deployed to a remote server, application server specific deployment descriptor files are generated at 230. If the deployment tool is being invoked as part of an integrated development environment tool, these application server specific deployment descriptor files may be generated within the environment tool. If the deployment tool is being invoked on a command line interface, these application server specific deployment descriptor files may be generated using the data from the processed EAR file shown at 204 and any other input obtained from the user during the deployment process. For example, if the target application server is a weblogic application server, a weblogic-ejb-jar.xml file may be generated as the deployment descriptor.

The deployment descriptor files may include, for example, the platform selected by the user as described above, and any other EJB properties that the user specified. For example, deployment of message driven EJBs requires that the user supply several pieces of information about the message queues to be supported. The system and method of the present disclosure provides one or more user interface panels to collect this information. That is, the one or more user interface panels help a person doing the deployment to specify information relating to message driven beans. The deployment tool of the present disclosure also allows the user to edit the deployment descriptors directly. After the deployment descriptors have been updated or generated, the EAR is reconstructed or repackaged with the modified deployment descriptors at 232. The resulting EAR file is then sent to the target application server at 234, for example, by using a file transfer protocol (FTP), and the process proceeds to step 240.

At 228, if it is determined that the EAR file is being deployed to a local server, that is, the server sitting on the same platform as the deployment tool, application server specific deployment files are generated. At 238, the generated application server specific deployment files are repackaged into EAR file.

At 240, a deployment procedure is executed by invoking a deploy method of the deployer interface implemented by the application server specific plug-in. At 242, it is determined whether the deployment was successful, and at 244, an appropriate deployment status report is generated.

In one embodiment, as described above, a plug-in is implemented for a corresponding application server to which applications and components are being deployed. In one embodiment, one or more interfaces are provided for plug-ins to implement for modifying existing deployment descriptors, repackaging, and deploying the files to a target application server and interacting with the deployment tool provided in the system and method of the present disclosure.

For example, a plug-in for an application server implements a Deployer interface. The Deployer interface provides various methods that a plug-in may use to deploy files to a desired target application servers. When the plug-in is instantiated, the "setHelper" method of the "DeploymentHelper" interface is called as a first method. The DeploymentHelper interface provides a way for a plug-in to get the information and services it needs after the plug-in is dynamically loaded, for example, by a class implementing the deployment wizard interface. Through the setHelper method, a DeploymentHelper object may be passed into the plug-in. In one embodiment, each plug-in keeps a local copy of this object and uses its methods to interact with the deployment tool of the present disclosure.

For plug-ins that support multiplatforms, a MultiPlatformPlugin interface is provided. If, for example, a plug-in does not implement this interface, the deployment tool of the present disclosure in one embodiment, assumes that the plug-in supports a single platform.

Replacer interface may be implemented by a plug-in. The plug-in supplies this interface when using the convertContainers method on the DeploymentHelper interface. ConvertContainers method opens the EAR files and scans through the deployment descriptors. The strings read from the deployment descriptor are passed to the Replacer interface as long as the Replacer remains active, for example, isActive method of the Replacer interface returns true. The methods in this interface are used to modify or update the deployment descriptors.

The checkForStart and checkForEnd methods of the Replacer interface are called to locate the beginning and end of strings that may need to be replaced. A string that may need to be replaced is passed to "willReplace," which returns true if the string will be replaced. The newstring method of the Replacer interface returns the replacement string. The initialize method of the Replacer interface is called whenever a new deployment descriptor is about to be processed.

WindowsServerPageUser interface is provided for plug-ins to implement in case a plug-in uses a default windows platform profile details page provided by the ExtendedHelper interface's method getWindowsServerPage. This interface provides a generic information retrieving panel, which a plug-in can use to obtain windows platform profile details from a user.

The ExtendedHelper interface generally allows a plug-in to make use of the extended features of the deployment helper interface. These extended features, in one embodiment, provide default implementations of the packaging and deployment features.

UnixServerPageUser interface is provided for plug-ins to implement in case a plug-in uses a default Unix platform profile details page provided by ExtendedHelper interface's method, getUnixServerPage method. This interface may be used by a plug-in that supports Unix or Linux based platforms to get Unix platform profile detail information. Alternatively, a plug-in may implement its own profile detail page for retrieving information related to a specific platform.

In one embodiment, a deployment tool provided in the system and method of the present disclosure may be started as a separate process using a command line interface. A batch file, for example, JoeDeployTool.bat, may be provided to help in starting the tool. The batch file sets the appropriate classpath for the tool and activates the tool. In one embodiment, the batch file is invoked with a location of the EAR file to be deployed, for example, as a parameter. Thus, for example, one usage of the batch file may be:

JoeDeployTool <EAR file location> [-ejbTree][-xmlEditor][-noProgress][-contextRoot warName rootName]
where,
EAR file location specifies the path of the EAR file;
-ejbTree causes display of a tree view of the EAR file;
-xmlEditor allows the XML editor to be invoked to edit deployment descriptors;
-noProgress prevents display of the final deployment progress panel, in which case, output that is normally displayed on progress page is sent to standard output;
-contextRoot warName rootName specifies the name of the context root to be used when deploying a web archive (war) file; this parameter may be repeated as many times as necessary to specify context roots for every war.

When the batch file, e.g., JoeDeployTool above, finishes, it leaves a status code in the ERRORLEVEL. A status of zero, for example, indicates a successful deployment and a status of two, for example, indicates that deployment failed. If a user terminates or cancels the deployment, a status of two may be returned.

Similarly, the deployment tool provided in the system and method of the present disclosure may be started from within a development environment tool such as Advantage Joe. For example, a class in the Advantage Joe implementing a deployment wizard interface may be started by right clicking on a project in the project tree. The menu option, "Deploy EJB's/War's" may be use to start the class which implement the deployment wizard interface.

Examples of interface definitions for the above-described interfaces provided to the plug-ins will now be described in more detail. As described above, the Deployer interface is implemented by each deployment plug-in. The following code defines the Deployer interface in one embodiment:

```
public interface Deployer {
    public void deploy( ) throws Deployment Exception;
    public void packageFiles( ) throws DeploymentException;
    public DeplWizPanel getNextPanel( );
    public ServerProfile addProfile (String sType);
    public String getResourceString (String key);
    public void setHelper (DeploymentHelper dm);
    public DeploymentHelper getHelper ( );
}
```

The deploy( ) method is called to begin a deployment process, for example, when a user clicks a finish button from user interface panel that is provided by a deployment tool for stepping the user through the deployment process. These user interface panels allow the user to enter application server specific variables and start the deployment. The deploy( ) method performs the deployment of all modules packaged in an EAR file as specified in the deployment descriptors. If an error occurs, it throws a DeploymentException. Each plug-in may have its own status and error messages displayed during execution.

The packageFiles( ) method is called prior to displaying a summary page. The summary page, for example, may allows a deployer to verify the deployment options before initiating deployment to the target application server. This method packages one or more files to be deployed. The packaged files in general result in an EAR file, but need not be limited to an EAR file only. If an error occurs, it throws a DeploymentException. Each plug-in may have its own status and error messages displayed during execution.

The getNextPanel( ) is used to display panels for collecting input data related to deployment from a user. Typically, a deployment tool provided in the system and method of the present disclosure displays an introductory page and a server profile selection page. Each plug-in implements the subsequent panels through this method. Each panel may extend either DeplwizPanel or DeplWizSummary. The DeplWizSummary extends DeplWizPanel.

The addProfile(String sType) is used to create a new default server profile for a selected application server type. For example, when a user clicks on add server profile button on the server profile selection page, this method of a corresponding plug-in is invoked. Each plug-in may includes its customized ServerProfile object, for example, J2EE_RIServerProfile, which extends ServerProfile. The ServerProfile class provides one or more useful attributes, and set and get methods for these attributes. A plug-in, however may add new attributes to a child of Server Profile object.

The getResourceString(String key) method may be used to access resource strings, for example, via plug-in's user interface(UI) panels. The plug-in class that implements the Deployer interface has a local ResourceBundle object, from which resource strings may be accessed or returned using this method. Generally, a ResouceBundle contains resource strings that are paired sequences of strings. One string represents a key and the other string represents a value associated with the key. A Java program access the ResourceBundle using the key string and the ResourceBundle returns the value to be used. ResourceBundles are used to allow a Java program to be customized for specific environments including different language environments.

The setHelper(DeploymentHelper dm) method is used to access the DeploymentHelper object, and returns a local copy of that object in one embodiment. The DeploymentHelper object will be described in more detail with reference to the DeploymentHelper interface.

The MultiPlatformPlugin interface is implemented by a plug-in if the plug-in supports multiple platforms. In one embodiment, if this interface is not implemented, the deployment tool provided in the system and method of the present disclosure assumes that only a single platform is supported.

The MultiPlatformPlugin interface defines the following methods:

```
public Iterator getPlatforms( );
public int getNumPlatforms( );
public DeplWizPanel getNextPanel(String platform).
```

The getplatforms( ) method returns Iterator of String objects, each String object containing the name of a platform. Each String object is used to list available platforms from which a user may select. The getNumPlatforms( ) method returns the number of platforms supported by this plug-in. The getNextPanel(String platform) method retrieves next panel for selecting a platform among multiple platforms supported by the plug-in.

The Replacer interface is implemented by a plug-in and is supplied when using the convertContainers method on the DeploymentHelper interface. ConvertContainers method opens the EAR files and scans through the deployment descriptors. The strings read from the deployment descriptor are passed to the Replacer interface when the isActive method returns true. The isActive method returns true as long as a plug-in still needs to convert portions of the deployment descriptor. When the plug-in is done with the deployment descriptor conversion, the isActive method returns false, at which time the Replacer may complete the conversion process. The checkForStart and checkForEnd methods are called to locate the beginning and end of strings which may need to be replaced. A string that may need to be replaced is passed to "willReplace," which returns true if the string is to be replace. The newString method returns the replacement string. The initialize method is called whenever a new deployment descriptor is about to be processed. The following methods are defined in the Replacer interface:

```
public boolean isActive( );
public boolean willReplace(String strToReplace);
public String newString( );
public int checkForStart(String str, int startingIndex);
public int checkForEnd(String str, int startingIndex);
public int endingSize( );
public void initialize( ).
```

The isActive( ) method returns true if additional searches or scans through the deployment descriptor are needed. The willReplace(String strToReplace) method returns true if the specified string is to be replaced. The parameter strToReplace includes the string that may need to be replaced.

The newString( ) method returns the replacement string. The checkForStart(String str, int startingindex) method returns index in specified string where substring to be replaced is located. For example, parameter str includes a string in which a starting sequence is searched, and parameter startingIndex includes a location in str at which to start looking. The checkForEnd(String str, int startingIndex) returns index of ending substring. For example, parameter str includes a string to search for the ending sequence and parameter startindex includes a location in str at which to start search. The endingSize( ) method returns size of the ending sequence. The initialize( ) method is used to reinitialize, typically before starting to convert another file.

The UnixServerPageUser interface defines the following methods in one embodiment for getting the labels needed for the fields on the panel:

```
public String getServerNameLabel( );
public String getHostNameLabel( );
public String getPortLabel( );
public String getUserIdLabel( );
public String getPasswordLabel( );
public String getDeployLocationLabel( ).
```

The UnixServerPageUser also defines public void validateFields(String serverName, String hostname, String portNumber, String userid, String password, String DeployLocation) to determine whether the fields are complete. The DeploymentHelper interface's method, "setValidationStatus" is called by the plug-in that implements this method to set fields as valid or invalid. If the fields are incomplete or invalid, the plug-in may use setValidateStatus to return a false indicator.

The WindowsServerPageUser interface defines the following methods to get the labels needed for the fields on the panel:

```
public String getServerNameLabel( );
public String getHostNameLabel( );
public String getPortLabel( ).
```

This interface also defines public void validateFields (String serverName, String hostName, String portNumber) to determine whether the fields are complete. The DeploymentHelper interface's method, "setValidationStatus" is called by the implementor of this method.

The system and method of the present disclosure also provides one or more additional interfaces that plug-ins may implement. For example, The Deployment Helper interface is provided to the plug-ins to provide a way for a plug-in to get the information and services it needs after being dynamically loaded by the deployment wizard. The plug-in may be built and released independent of the deployment tool.

An example definition of the DeployerHelper interface may be:

```
public interface DeployerHelper {
    public static final int SUCCESS = 0;
    public static final int FAILED = 2;
    public Vector getJ2eeApplications ( );
    public Vector getEjbJars(DeploymentModule de);
    public ResourceBundle getBundle( );
    public void saveProfile( );
    public ServerProfile getWorkingProfile( );
    public Vector getHosts( );
    public Boolean isStopped( );
    public void log(String text);
    public void logError(String text);
    public void logWarning(String text);
    public void logInformation(String text);
    public void setFinishButtonEnabled (boolean b);
    public void setNextButtonEnabled(Boolean b);
    public void setCursor(int cursorType);
    public DeplWizPanel getNextPage(Deployer deployer);
    public void updateFrameStatus( );
    public void saveState(DeploymentModule de, String earPath);
    public int getResult( );
    public void setDocTypeInfo(String defaultEarDocType, String
 defaultEarDtdPath, String defaultEjbDocType, String
 defaultEjbDtdPath);
    public void setDocTypeInfor(ResourceBundle bundle);
    public void setEJB11(Boolean value);
    public void setEJB11( );
    public void convertContainer(Replacer stringReplacer);
    public Boolean isEjbOrWarAvailable( );
    public StringWriter executCommand(String cmd, Boolean
 verboseOnException) throws DeploymentException;
    public StringWriter executeCommand(String cmd) throws
 DeploymentException;
    public String getVariableValue(String variableName);}
```

DeploymentModules are objects that correspond to any J2EE deployment modules. For example, DeploymentModules include a collection of deployment modules such as ejb-jars, web archives, client jars that J2EE modules contain. Thus, in the above interface definition, the getJ2eeApplication( ) method returns a Vector of DeploymentModule objects that correspond to J2EE applications, which were selected to be deployed by a user.

The getEjbJars(DeploymentModule de) method returns a Vector of DeploymentModule objects that correspond to ejb-jars for a given J2EE Application.

The getBundle( ) method returns the ResourceBundle for the deployment tool of the present disclosure. The saveProfile( ) method is invoked if a profile for a given server is to be saved, for example, for a future use. For example, when a user is finished with a panel that collects server profile information, this method may be invoked to save the profile data that the user entered using the panel. In one embodiment, the deployment tool provided in the present disclosure automatically manages saving and retrieving of the ServerProfile objects for a plug-in. This method, however, is available for the plug-ins to also implement if desired.

The getWorkingProfile( ) method is invoked to get the information on the target server that a user specified for deployment. For example, when a user selects one of the server profile objects, the deployment tool provided in the system and method of the present disclosure sets a working profile using the selected server profile object.

The getHosts( ) method returns a list of unique host names used in all saved Server Profile objects. If a plug-in desires to provide this list, for example, in a drop down list, as a convenience to the user, this method may be used.

The isStopped( ) method is invoked to test if a deployment wizard, through which the deployment process began, has stopped. The plug-in then may terminated itself when this method returns true.

The log(String text) method is used to display any normal status messages once the deploy method is called. Any information related to the deployment process such as steps completed may be sent to an output window.

The logError(String text) method is invoked to display any error status messages once the deploy method is called. Any information related to the deployment process, such as exceptions, may be sent to an output window.

The logWarning(String text) method is used to display any warning status messages once the deploy method is called. Any information related to the deployment process such as incomplete steps may be sent to an output window.

The logInformation(String text) method is used to display any informational status messages once the deploy method is called. Information related to the deployment process such as unusual conditions that do not affect the output may be sent to an output window.

The setFinishButtonEnabled(boolean b) method is used to enable or disable a Finish button. The enabling and disabling of this button may depend on a previous user input.

The setNextButtonEnabled(boolean b) method is used to enable or disable a Next button. The enabling and disabling of this button may depend on a previous user input.

The setCursor(int cursorType) method is used to change the cursor type, for example, to change the cursor to wait cursor during a long running process.

The getNextPage(Deployer deployer) method is called to get the next page to display in a deployment tool, for example, the deployment wizard.

The updateFrameStatus( ) method is used to notify deployment helper interface classes that some action occurred on a plug-in panel. These actions may include updating a data field or pressing certain buttons on the panel. The actions which warrant a call to the deployment helper interface classes may be determined by a plug-in.

The getResut( ) method returns an execution result of a deployment tool that is invoking the plug-in, for example, the deployment tool of the present disclosure.

The setDocTypeInfo(String defaultEarDocType, String defaultEarDtdPath, String defaultEjbDocType, String defaultEjbDtdPath) method is used to optionally override a default DOCTYPE information.

The setDocTypeInfor(ResourceBundle bundle) method is used to optionally override a default DOCTYPE information from the properties file.

The setEJB11(Boolean value) and setEJBll( ) methods are used to optionally indicate that the target is compatible with EJB 1.1 version.

The convertContainer(Replacer stringReplacer) method is used to convert containers using plug-in supplied string replacer. This method is used to modify the deployment descriptors and to update the JARS and EARS with modified deployment descriptors.

The isEjbOrwarAvailable( ) returns true if an EJB or Web application is available to deploy.

executeCommand(String cmd, Boolean verboseOnException) and executeCommand(String cmd) methods execute command indicated in the parameter "cmd" in a separate process. The results of the cmd are returned in a StringWriter object. The verboseOnException parameter tells the method to put results in a log on an exception.

getvariableValue(String variableName) method returns the value of an environmental variables. The method returns null if the variables are not defined.

Another interface provided for plug-ins to implement is ExtendedHelper interface. This interface allows a plug-in to make use of the extended features of the helper interface, which provide default implementations of the packaging and deployment features.

An example definition of the ExtendeHelper interface may include the following methods:

```
public Boolean isEarInput( );
public DeplWizPanel getWindowsServerPage(WindowsServerPageUser pageUser);
public DeplWizPanel getUnixServerPage(UnixServerPageUser pageUser);
public String createEarFile(DeploymentModule de, int appCount) throws DeploymentException;
public void createRuntimeXml(DeploymnetModule de, String earPath) throws Deployment Exception;
public void invokeCommandLine(String[ ] progArray, String processID, String prevErrorMsg) throws DeploymentException;
public void invokeCommandLine(String[ ] progArray, String processID) throws DeploymentException;
public void invokeCommandLine(String progString, String processID) throws DeploymentException;
public void genFTPContainers(ResourceBundle bundle) throws DeploymentException;
public void deployFTPContainers(ResourceBundle bundle) throws Deployment Exception;
public void genContainers(ResrouceBundle bundle) throws DeploymnetException;
public Vector getEarPath( );
pubic void deployContainers(ResourceBundel bundle) throws Deployment Exception;
public void setGenerateSql(boolean value).
```

In the above definition, the isEarInput( ) method returns true if an EAR file was input to the deployment tool, for example, when called as a standalone mode.

The getWindowsServerPage(WindowsServerPageUser pageuser) method returns a default server details page for a windows based server.

The getUnixServerPage(UnixServerPageUser pageuser) method returns a default server details page for a Unix based server. This page, for example, collects ftp (file transfer protocol) parameters.

The createEarFile(DeploymentModule de, int appCount) method is used to specify modules and sub-modules to build an EAR file.

The createRuntimeXml(DeploymnetModule de, String earpath) method is used to create a sun-j2ee-ri.xml file for the EAR file, a deployment descriptor to J2EE Reference Implementation.

The invokeCommandLine(String[ ] progArray, String processID, String prevErrorMsg), invokeCommandLine (String progString, String processID) and invokeCommand-Line(String[ ] progArray, String processID) methods are used to invoke a command using a command line interface.

The genFTPContainers(ResourceBundle bundle) method generates EAR files to be sent via ftp.

The deployFTPContainers(ResourceBundle bundle) method transfers the EAR files, for example, by ftp.

The genContainers(ResrouceBundle bundle) method generates the EAR files.

The getEarPath( ) method returns the local paths to access the EAR files.

The deployContainers(ResourceBundel bundle) method deploys the EAR files.

The setGenerateSql(boolean value) method allows a plug-in to specify whether to attempt to generate SQL (sequential query language) using the J2EE deploy tool. The parameter "value," for example, returns true if SQL is to be generated. The default is false.

The interfaces and the defined methods shown above are described only as examples, and should not be construed as being the only way of implementing the system and method provided in the present disclosure. Rather, those skilled in the art of computer programming will appreciate that methods and interface definitions can vary while still implementing similar functional procedures for achieving similar results.

Figure 3:
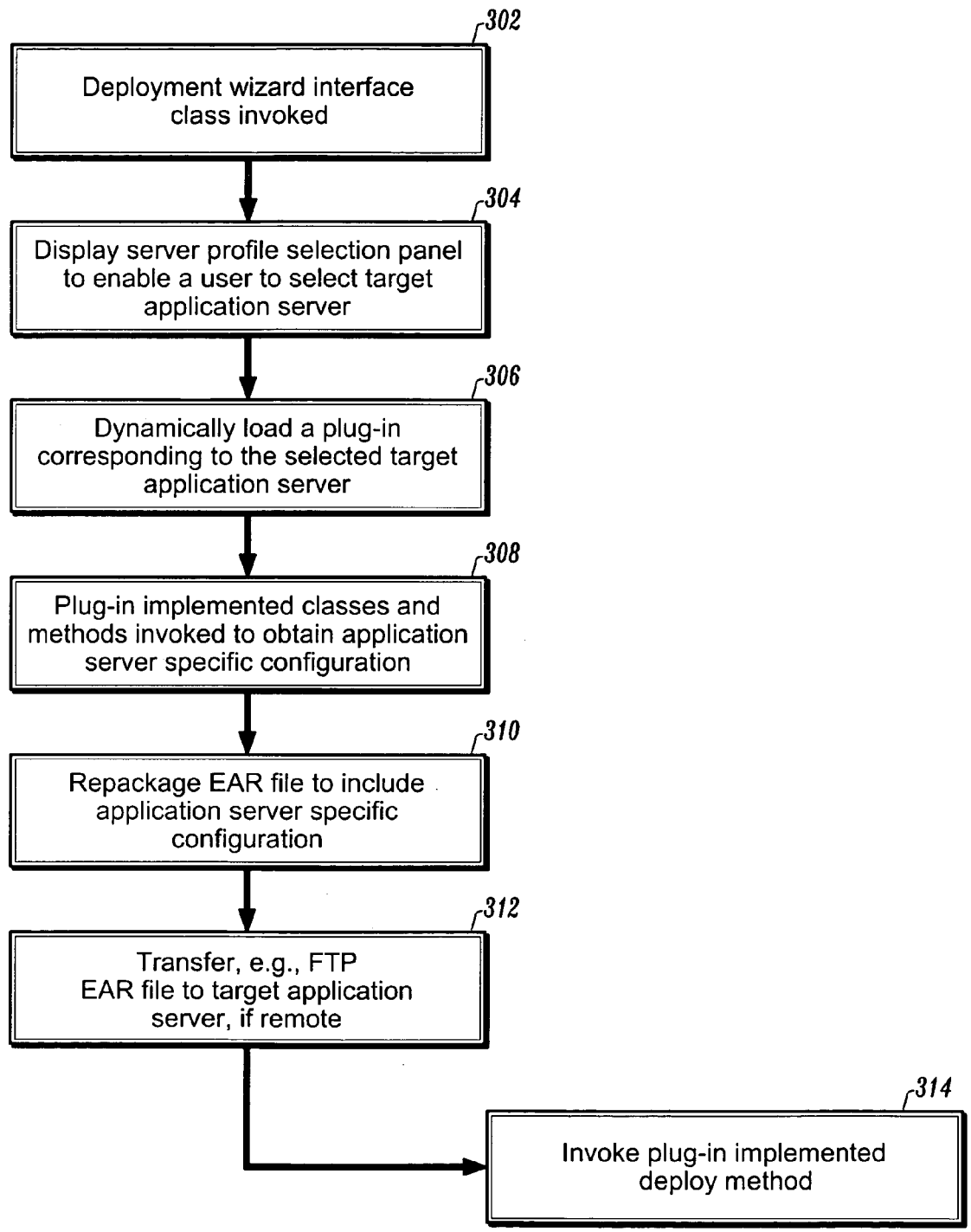
FIG. 3 is process flow diagram that illustrates the deployment method in one embodiment.
Figure 4:
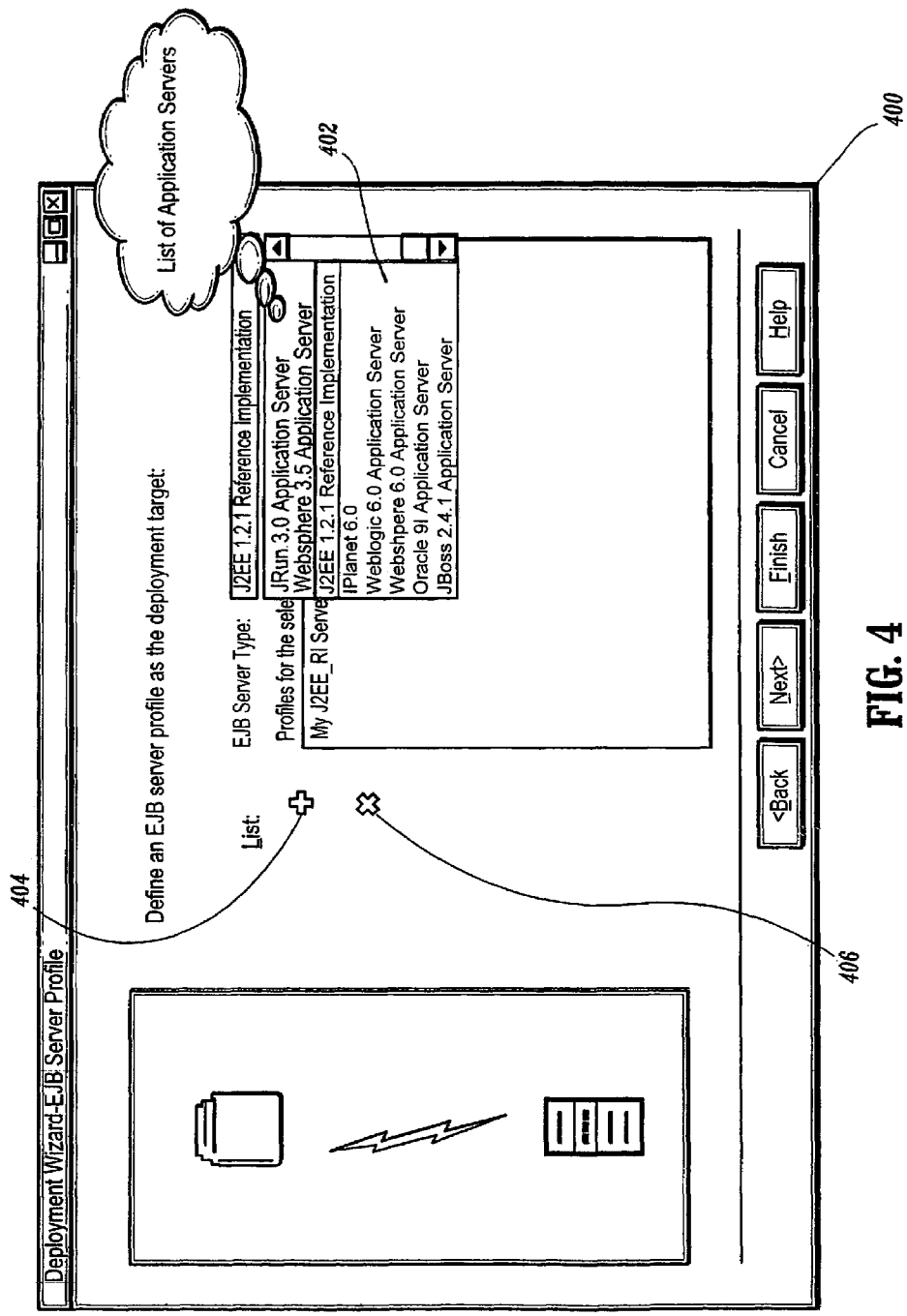
FIGS. 4–13 are examples of screen panels in one embodiment that are presented to a user for guiding the user through deployment process and collecting deployment information relating to particular target application servers.
Figure 5:
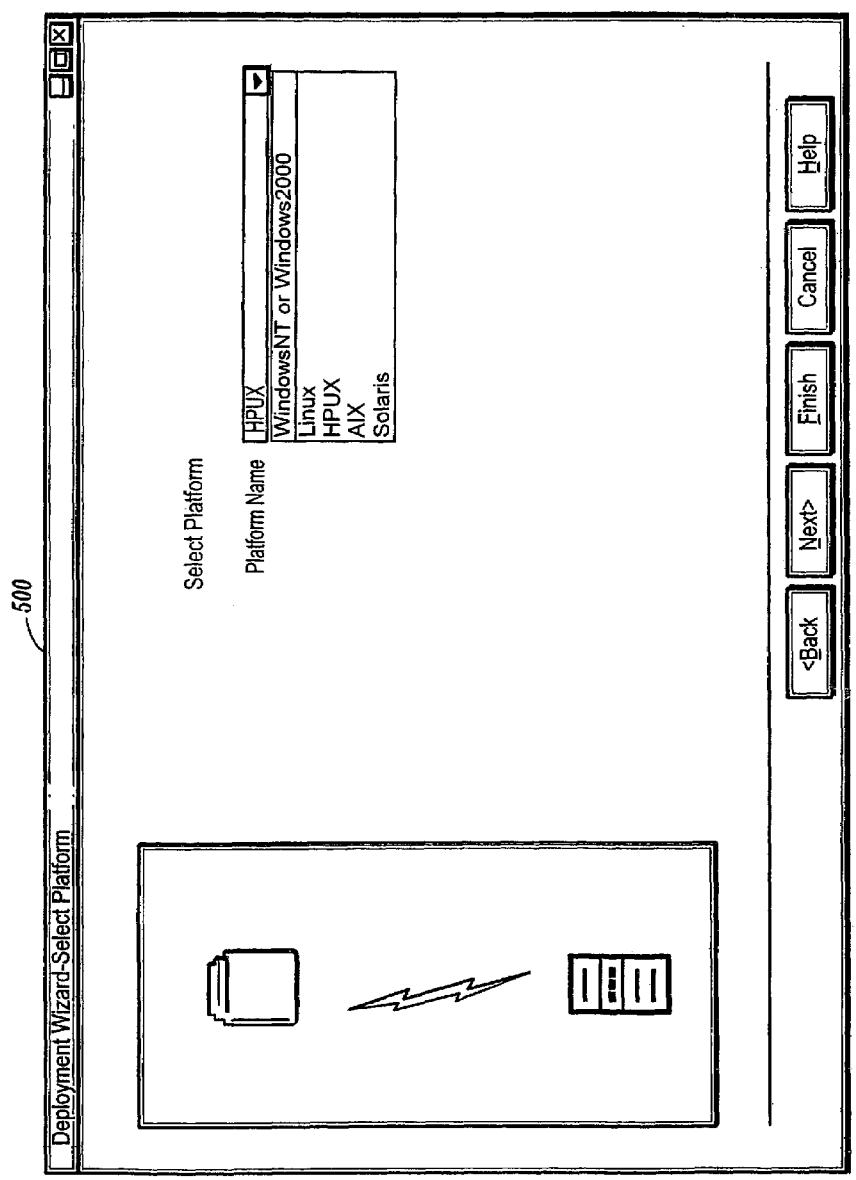

A deployment method using the deployment tool provided in the system and method of the present disclosure in one embodiment will now be described with reference to FIG. 3 and FIG. 4-13, which illustrate a plurality of panels used during the deployment process. FIG. 3 is a process flow diagram that illustrates the deployment method in one embodiment and also refers to the examples of classes and methods that are invoked during the process. Typically, a person acting in a role of an EJB deployer, referred to as a user, uses the deployment tool. When the deployment tool is initiated, for example, on a command line or via a development environment tool, a method of a deployment wizard interface implemented by the deployment tool is invoked to present the user with an initial panel shown in FIG. 4. The panel 400 lists a list of available application servers 402 and also a "+" button 404 and a "X" button 406. This panel allows the user to select a target application server and to define a server profile for the selected target application server as shown at 304.

If no profile exists for a particular application server, a new server profile may be added, for example, by clicking on the "+" button 404. An "X" button 406 may be used to delete an existing server profile. Server profiles may be created for any application server for which there exists a deployment plug-in. Server profiles are saved between invocations of the deployment tool.

At 306, a deployment plug-in is dynamically loaded and instantiated. The deployment plug-ins implement the interfaces described above. Multiple profiles may be maintained for each server type. At 308, plug-in implemented methods are invoked to obtain application server specific configuration information. This information is used to modify deployment descriptor files used during deployment. At 310, EAR file having application server specific configuration information is repackaged. At 312, if the selected target application server is located on a remote machine, EAR file is transferred, for example, by FTP, to that target application server. At 314, a deploy method implemented by the plug-in is invoked to deploy the EAR file to the selected target application server.

The plug-in implemented classes invoked at 308 include MultiPlatformPlugin interface classes for those plug-ins that support more than one platform. For example, the display panel shown in FIG. 5 may be displayed when the plug-in's getNextPanel method is invoked with a list of platform supported by this plug-in. The list of platform is obtained by invoking the getPlatforms method implemented by this plug-in.

This panel 500 allows a user, that is, the person doing the deployment, to select a type of platform that will be used as the target for this deployment operation. The platforms displayed in the drop-down list are supported by the plug-in.

Application server specific properties obtained through a plug-in may include various server profile details. The server profile details can vary depending on the information needed to deploy to the specified application server and platform. These profile details are saved in the server profile and are made available as default values the next time the server profile is requested. The profile details are retrieved and displayed, for example, using a panel shown in FIG. 6 as default values by invoking UnixServerPageUser or WindowsServerPageUser class methods. These panels are available for use by a plug-in and may be obtained from a particular plug-in by accessing the DeploymentHelper interface.

Figure 6:
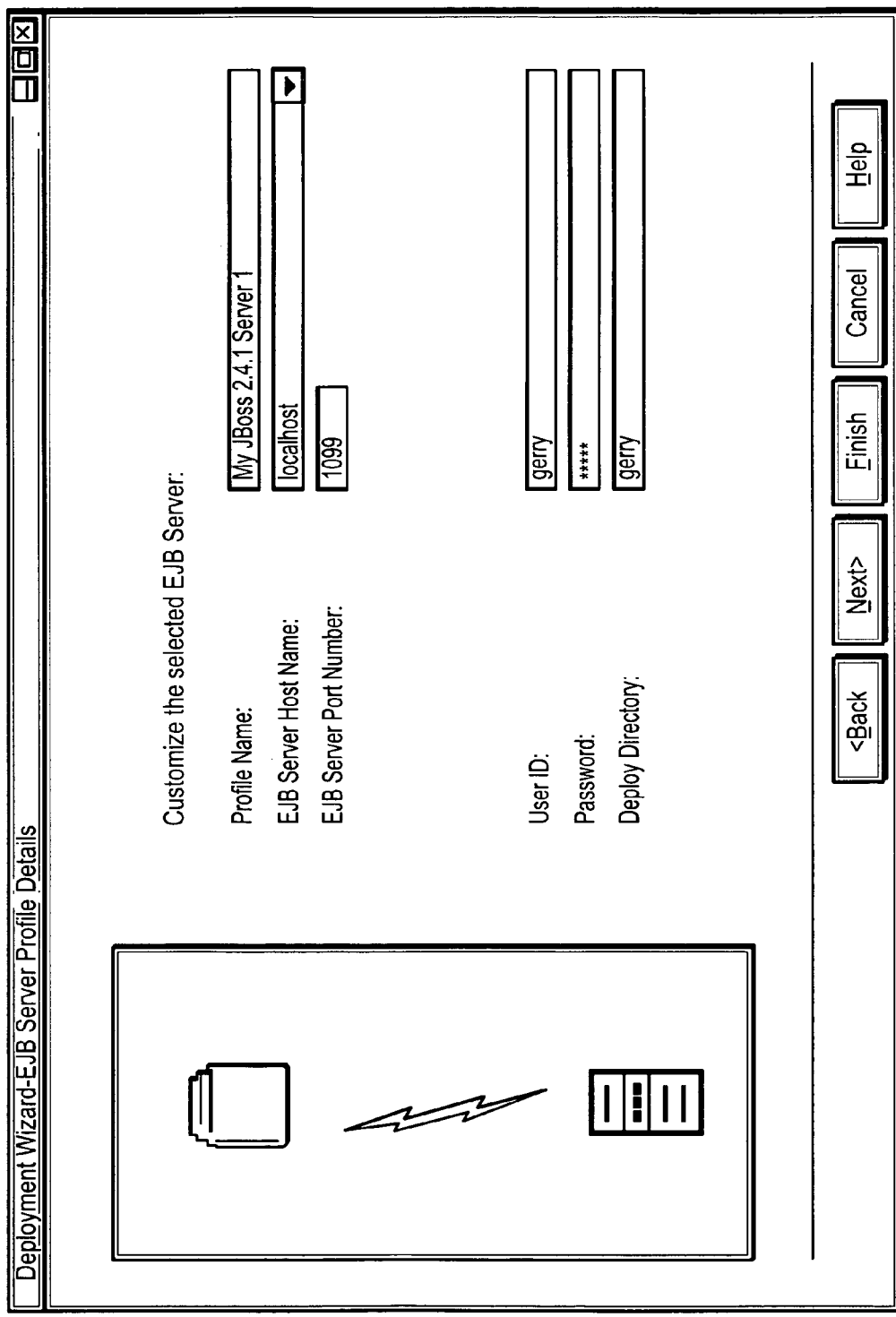
Figure 7:
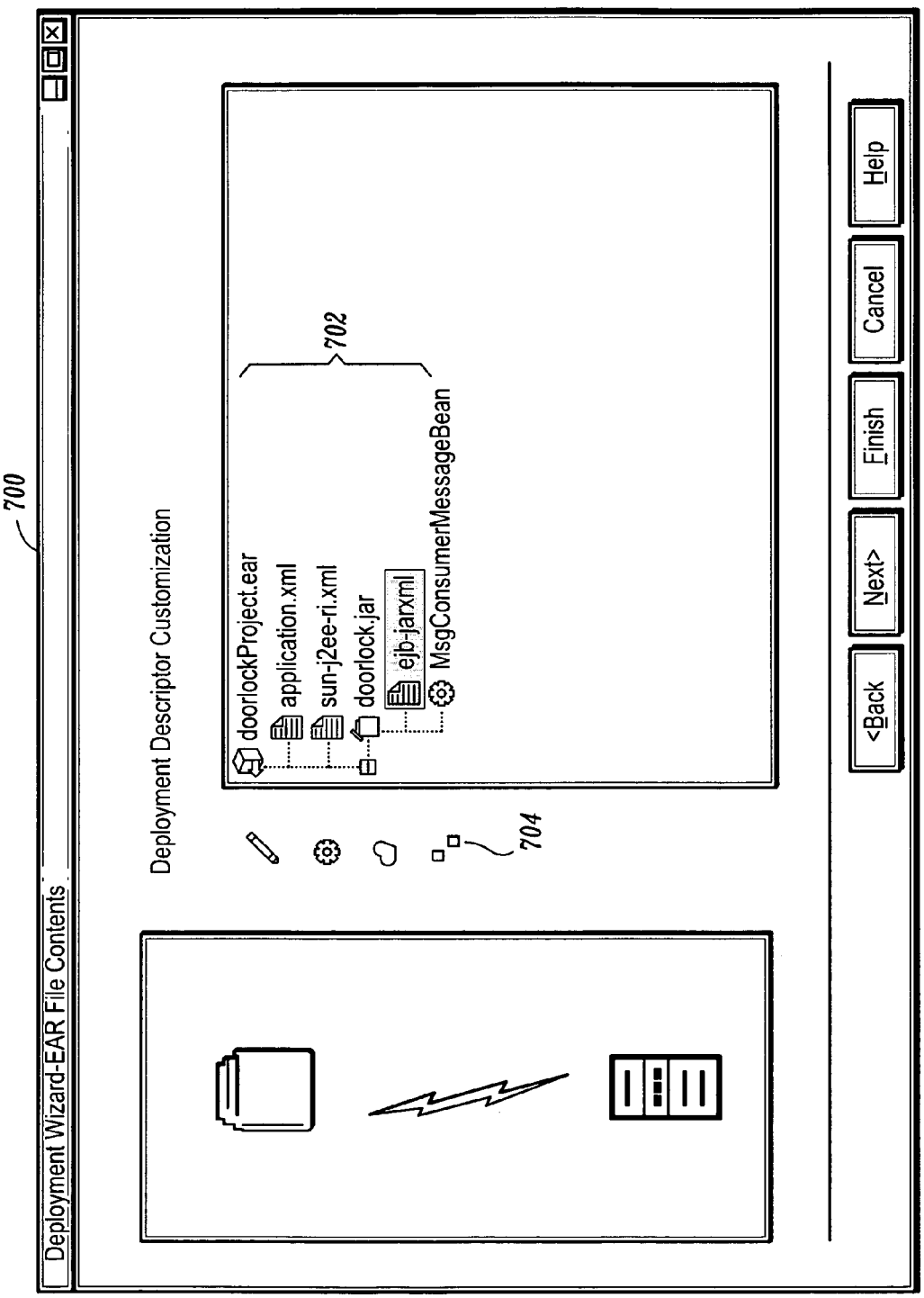

If the information acquired via the panel shown in FIG. 6 is sufficient for a plug-in, then it may be used by a plug-in via the DeploymentHelper interface. Alternatively, plug-ins may implement a different profile detail panels to obtain server profile detail information.

Figure 8:
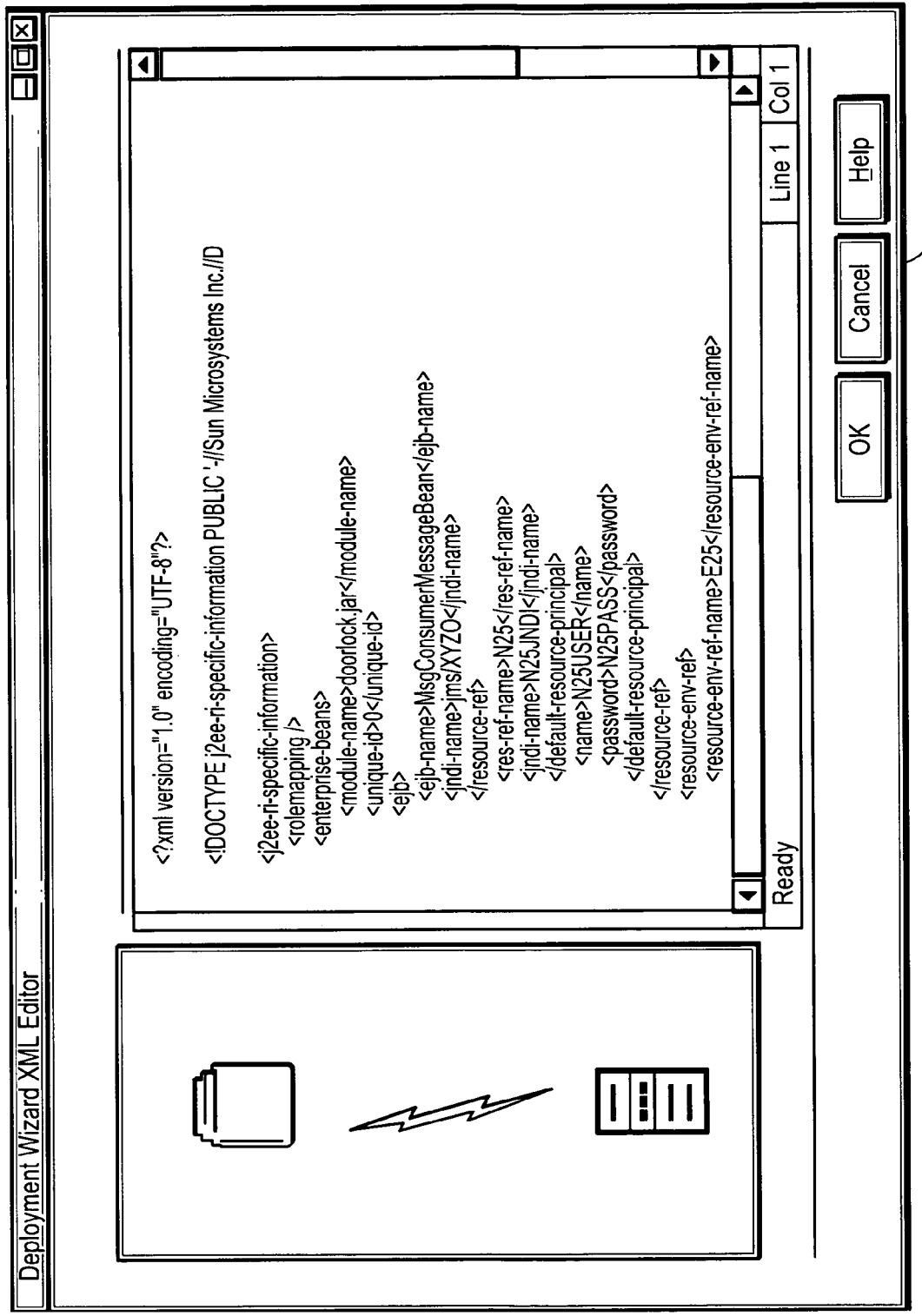

Once the deployment details have been specified for a server, the EAR file is packaged and displayed. The user may then modify the deployment descriptors for the J2EE modules. The deployment descriptor may be modified in a number of different ways. An XML editor may be used to edit the XML files selected, for example, from a panel showing EJB display tree illustrated in FIG. 7. Once a user selects an XML file, other panels may be activated to open an editor to modify selected portions of the deployment descriptors as shown in FIG. 8. Also from the EAR file contents panel shown in FIG. 7, a message driven bean, for example, may be selected by a user if the user desires to specify parameters related to the message driven bean. Once the message driven bean is selected, a panel for specifying the parameters may be invoked.

Generally, an implemented class in the deployment tool of the present disclosure displays a panel showing a EJB display tree 702. The objects on the tree may be modified by selecting different buttons 704 on the panel. The buttons are connected to methods in the class, which then activate additional panels.

Referring to FIG. 8, an XML editor provides a user with the capability to modify the deployment descriptors in any way the user desires. Alternatively, the XML editor may be disabled by the deployment tool when it is first invoked. The XML editor may provide formatting and highlighting specific to XML.

Figure 9:
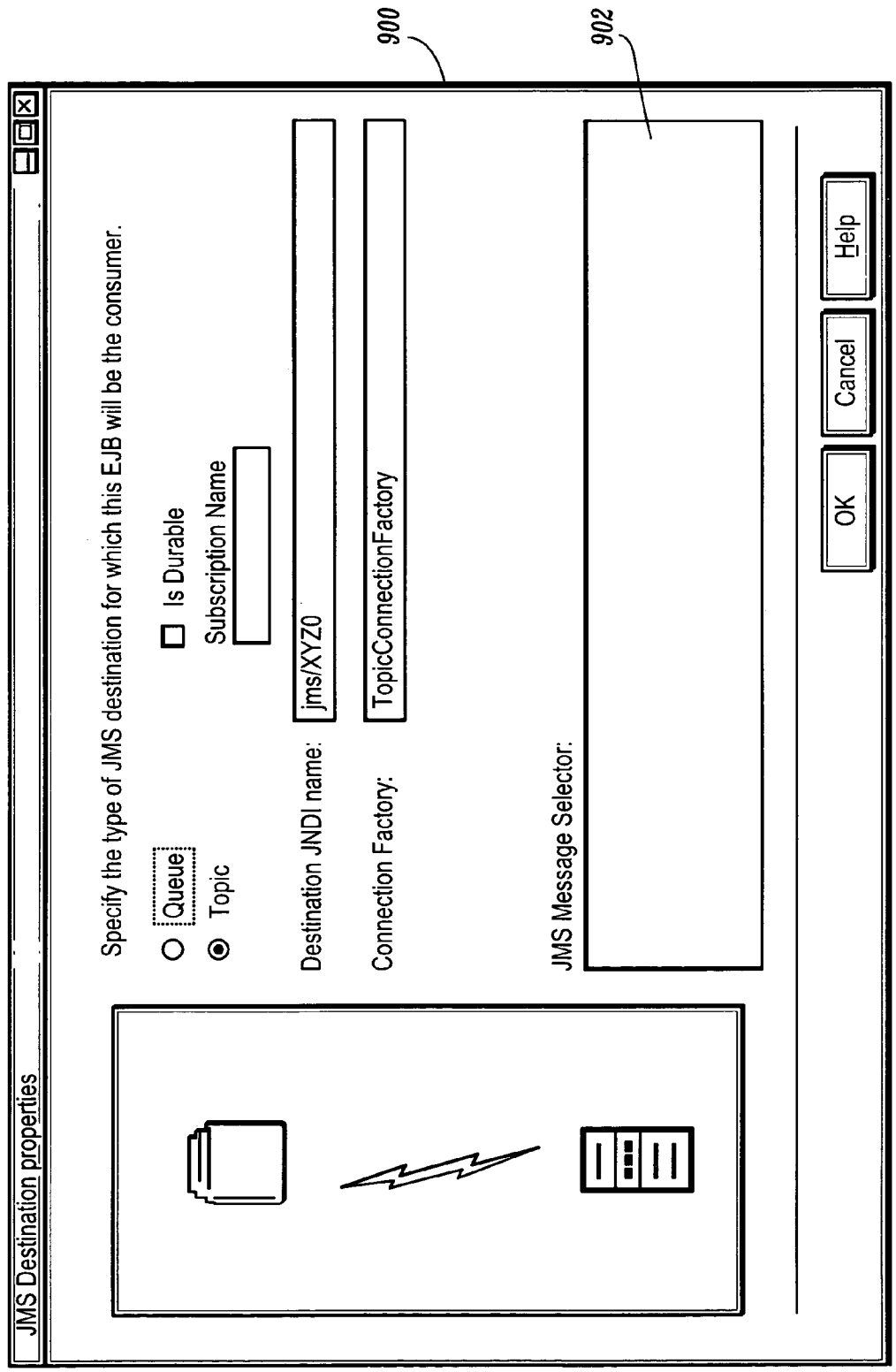

A JMS destination properties panel shown in FIG. 9, for example, allows a user to specify one or more parameters necessary to configure an EJB as a JMS (Java message service) destination. The name of the connection factory may default to either TopicConnectionFactory or QueueConnectionFactory, depending upon the message type being used. If desired, a user may enter in this field the JNDI name of any JMS connection factory installed on the target J2EE application server.

The JMS message selector 902 is an expression that causes incoming messages to be filtered based upon their properties. For example, a message selector expression may appear as:

NewsType='Weather' OR NewsTypes='Politics'

This message selector 902 causes only messages having a "NewsType" property defined with a value of 'Weather' or 'Politics' to be received by the message consumer.

The information collected using the above-described panels, also referred to as deployment properties panels, is used to generate respective fields in the appropriate deployment descriptors.

As known to those skilled in the art, EJB deployment descriptor is an XML descriptor included in a Java Archive (JAR) of an enterprise bean. This file, ejb-jar-xml, contains the message bean definition, its JMS message selector, the destination type, and its subscription durability for Topics. The descriptor fields used to represent these properties are shown in the following example. Some of the information collected in the above-described example panels are indicated in italics:

```
<ejb-jar>
    <description>no description</description>
    <display name>NewsReceiverJar</display-name>
    <enterprise-beans>
        <message-driven>
            <description>no description</description>
            <display name>NewsReceiver</display-name>
            <ejb-name>NewsReceiverMessageBean</ejb-name>
            <ejb-class>NewsReceiverMessageBean</ejb-class>
            <transaction-type>Container</transaction-type>
            <message-selector>
                NewsType='Weather' OR NewsType='Politics'
            </message-selector>
            <message-driven-destination>
                <destination-type>
                    javax.jms.Topic</destination-type>
                <subscription-durability>
                    Durable</subscription-durability>
            </message-driven-destination>
            <security-identity>
                <description></description>
                <run-as-specified-identity>
                    <description></description>
                    <role-name></role-name>
                </run-as-specified-identity>
            </security-identity>
        </message-driven>
    </enterprise-beans>
    <assembly-descriptor>
        <container-transaction>
            <method>
                <ejb-name>NewsReceiveMessageBean</ejb-name>
                <method-intf>Bean</method-intf>
                <method-name>onMessage</method-name>
                <method-parms>
                    <method-param>
                        javax.jms.Message</method-param>
                </method-parms>
            </method>
            <trans-attribute>Required</trans-attribute>
        </container-transaction>
    </assembly-descriptor>
</ejb-jar>
```

The EAR descriptor format may differ among application server vendors. The following example shows the format used by the J2EE Reference Implementation application server. Examples of information that may be collected using the above-described panel and used to update the descriptor is shown in italics.

```
<j2ee-ri-specific-information>
    <server-name></server-name>
    <rolemapping></rolemapping>
    <enterprise-beans>
        <module-name>NewsReceiver.jar</module-name>
        <unique-id>0</unique-id>
        <ejb>
            <ejb-name>NewsReceiverMessageDrivenBean
            </ejb-name>
            <jndi-name>NewsTopic</jndi-name>
            <ior-security-config>
                <transport-config>
                    <integrity>supported</integrity>
                    <confidentiality>supported</confidentiality>
                    <establish-trust-in-target>supported
                    </establish-trust-in-target>
                    <establish-trust-in-client>supported
                    </establish-trust-in- client>
                </transport-config>
                <as-context>
                    <auth-method>username_password
                    </auth-method>
                    <realm>default</realm>
                    <required>true</required>
                </as-context>
                <sas-context>
                    <caller-propagation>supported
                    </caller-propagation>
                </sas-context>
            </ior-security-config>
            <principal>
                <name></name>
            </principal>
            <jms-durable-subscription-name>MySub
            </jms-durable-subscription-name>
            <mdb-connection-factory>NewsConnectionFactory
            </mdb-connection-factory>
        </ejb>
    </enterprise-beans>
</j2ee-ri-specific-information>
```

Figure 10:
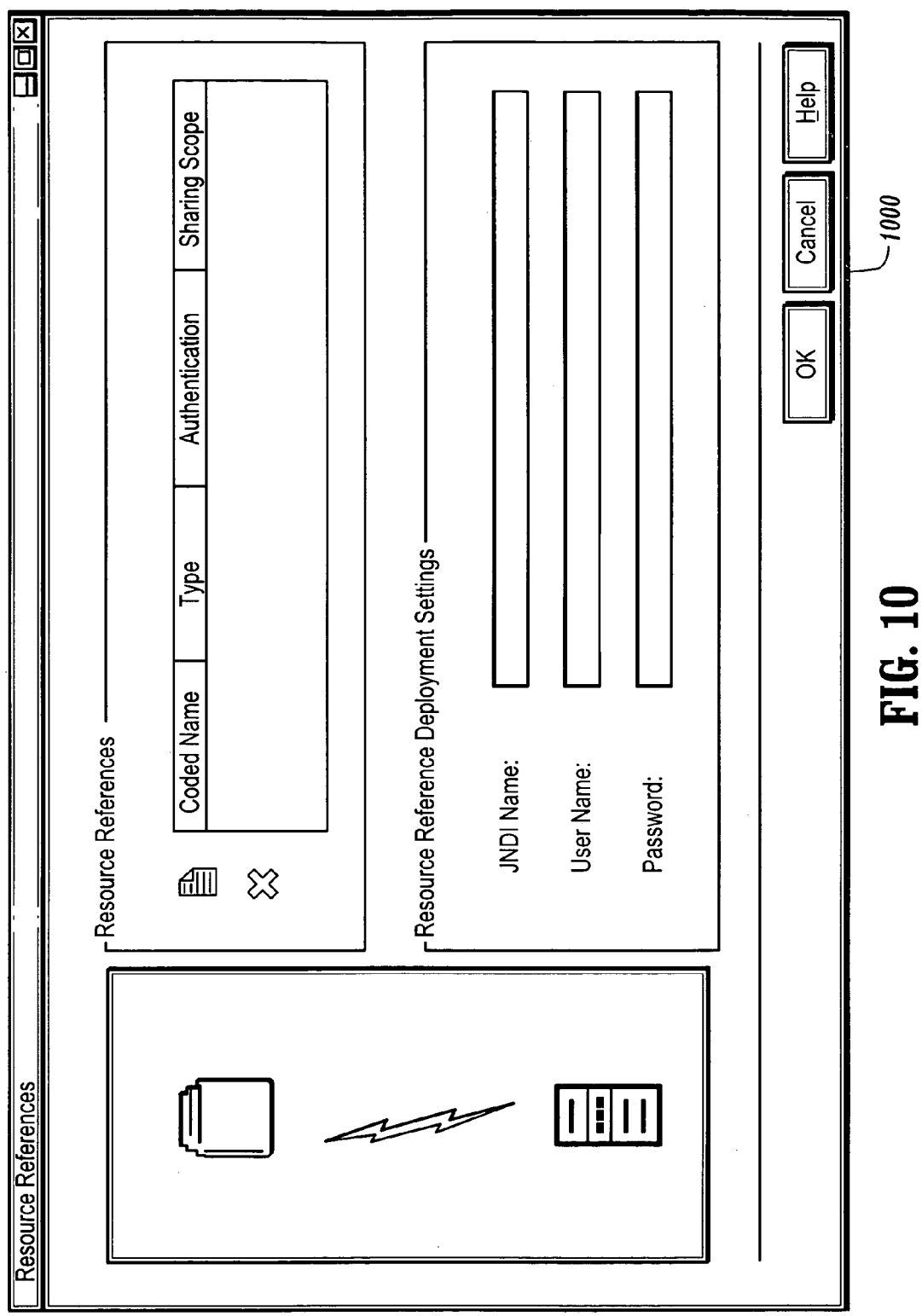

EJB's that reference other resources may have the appropriate information added to their deployment descriptor using a resource references panel provided by the system and method of the present disclosure. FIG. 10 shows a resource references panel in one embodiment. The JNDI name, user name, and password fields are associated with the selected resource reference.

If the resource references panel 1000 is used to add additional information related to resources referenced by the EJB's, the EJB deployment descriptor, for example, ejb-jar.xml, shown above, need to include resource reference definitions for the JMS objects accessed via JNDI. For message producers sending messages to a single topic or queue, there are only two JNDI references: the connection factory and the topic/queue. For example, the following session bean deployment descriptor shows how JMS references (in italic) are defined for a message producer that publishes a message to a topic:

```
<ejb-jar>
    <description>no description</description>
    <display-name>NewsBroadcasterJar</display-name>
    <enterprise-beans>
        <session>
            <description>no description</description>
            <display-name>NewsBroadcaster</desplay-name>
            <ejb-name>NewsBroadcastersessionBean</ejb-name>
```

-continued

```
        <home>NewsBroadcasterHome</home>
        <remote>NewsBroadcasterRemote</remote>
        <ejb-class>NewsBroadcasterSessionBean
        </ejb-class>
        <session-type>Stateless</session-type>
        <transaction-type>Container<transaction-type>
        <security-identity>
            <description></description>
            <use-caller-identity></use-caller-identity>
        </security-identity>
        <resource-ref>
            <res-ref-name>jms/NewsConnectonFactory
            </res-ref-name>
            <res-type>javax.jms.TopicConnectionFactory
            </res-type>
            <res-auth>Container</res-auth>
            <res-sharing-scope>Shareable
            </res-sharing-scope>
        </resource-ref>
        <resource-env-ref>
            <resource-env-ref-name>jms/NewsTopic
            </resource-env-ref-name>
            <resource-env-ref-type>javax.jms.Topic
            </resource-env-ref-type>
        </resource-env-ref>
    </session>
</enterprise-beans>
<assembly-descriptor>
    <container-transaction>
        <method>
            <ejb-name>NewsBroadcasterSessionBean
            </ejb-name>
            <method-intf>Remote</method-intf>
            <method-name>broadcastNews</method-name>
            <method-params></method-params>
        </method>
        <trans-attribute>Required</trans-attribute>
    </container-transaction>
</assembly-descriptor>
</ejb-jar>
```

In addition to specifying references in the EJB deployment descriptor, references to the connection factory and topic/queue names are also specified in the EAR deployment descriptor. The EAR descriptor format may differ among application server vendors. The following EAR descriptor shows how these references (shown in italic) may be specified for deployment of a session bean publishing messages to a topic:

```
<j2ee-ri-speific-information>
    <server-name></server-name>
    <rolemapping></rolemapping>
    <enterprise-beans>
        <module-name>NewsBroadcaster.jar</module-name>
        <unique-id>0</unique-id>
        <ejb>
            <ejb-name>NewsBroadcasterSessionBean
            </ejb-name>
            <jndi-name>NewsBroadcaster</jndi-name>
            <ior-security-config>
                <transport-config>
                    <integrity>supported</integrity>
                    <confidentiality>supported
                    </confidentiality>
                    <establish-trust-in-target>supported
                    </establish-trust-in-target>
                    <establish-trust-in-client>supported
                    </establish-trust-in- client>
                </transport-config>
                <as-context>
                    <auth-method>username_password
                    </auth-method>
                    <realm>default</realm>
```

-continued

```
                    <required>true</required>
                </as-context>
                <sas-context>
                    <caller-propagation>supported
                    </caller-propagation>
                </sas-context>
            </ior-security-config>
            <resource-ref>
                <res-ref-name>jms/NewsConnectionFactory
                </res-ref-name>
                <jndi-name>TopicConnectionFactory
                </jndi-name>
                <default-resource-principal>
                    <name>name</name>
                    <password>password</password>
                </default-resource-principal>
            </resource-ref>
            <resource-env-ref>
                <resource-env-ref-name>jms/NewsName
                </resource-env-ref-name>
                <jndi-name>NewsTopic<jndi-name>
            </resource-env-ref>
        </ejb>
    </enterprise-beans>
</j2ee-ri-speific-information>
```

Figure 11:
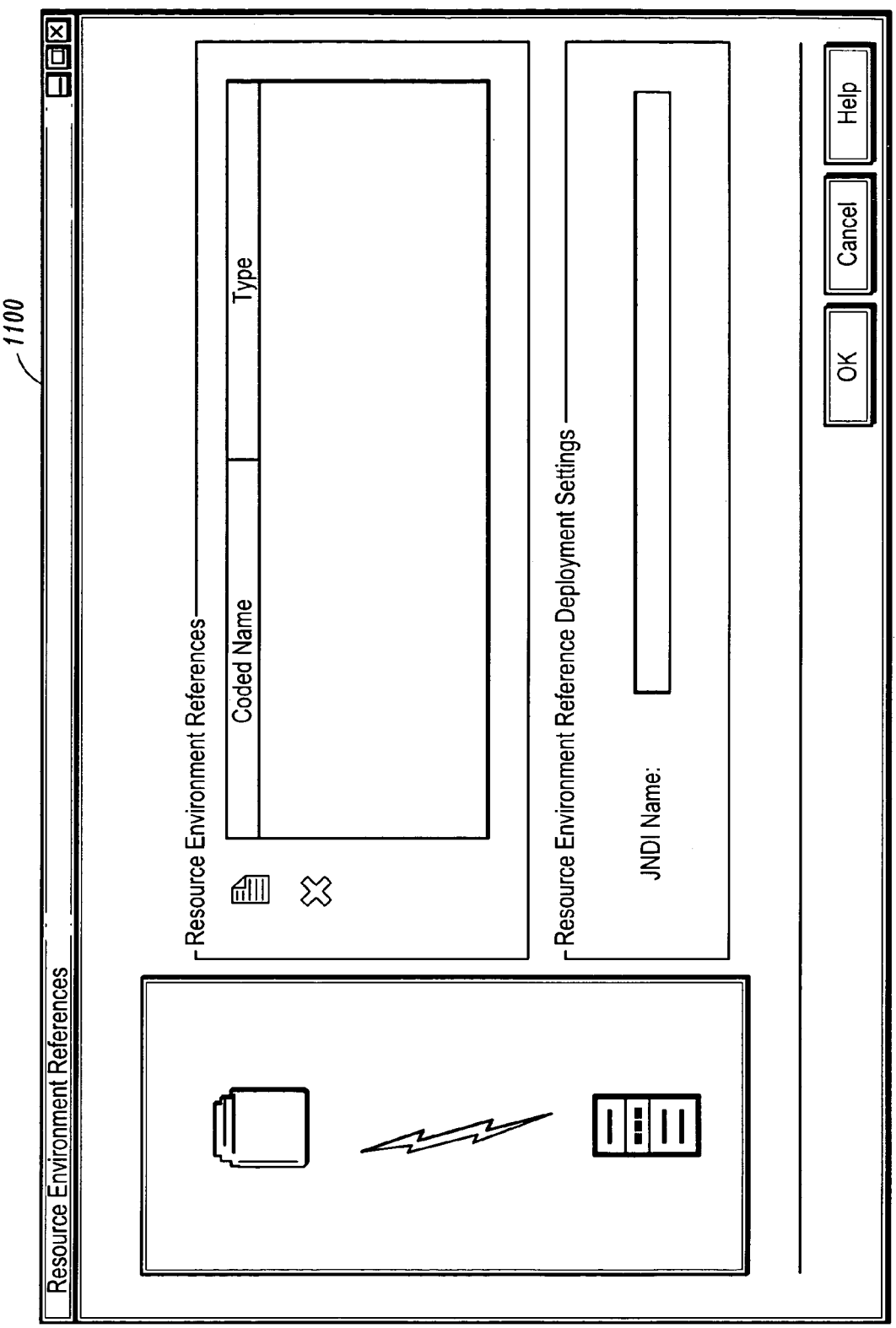

FIG. 11 shows a resource environment references panel. Resource environment references allow a resource to be referred to by a different name in the source code of the application compared to its JNDI name. This panel 1100 may be used to allow a user, for example, a person doing the deployment, to specify a correlation between the coded name and the JNDI name. This allows the JNDI name to vary between deployment environments without having to modify the EJB source code.

Figure 12:
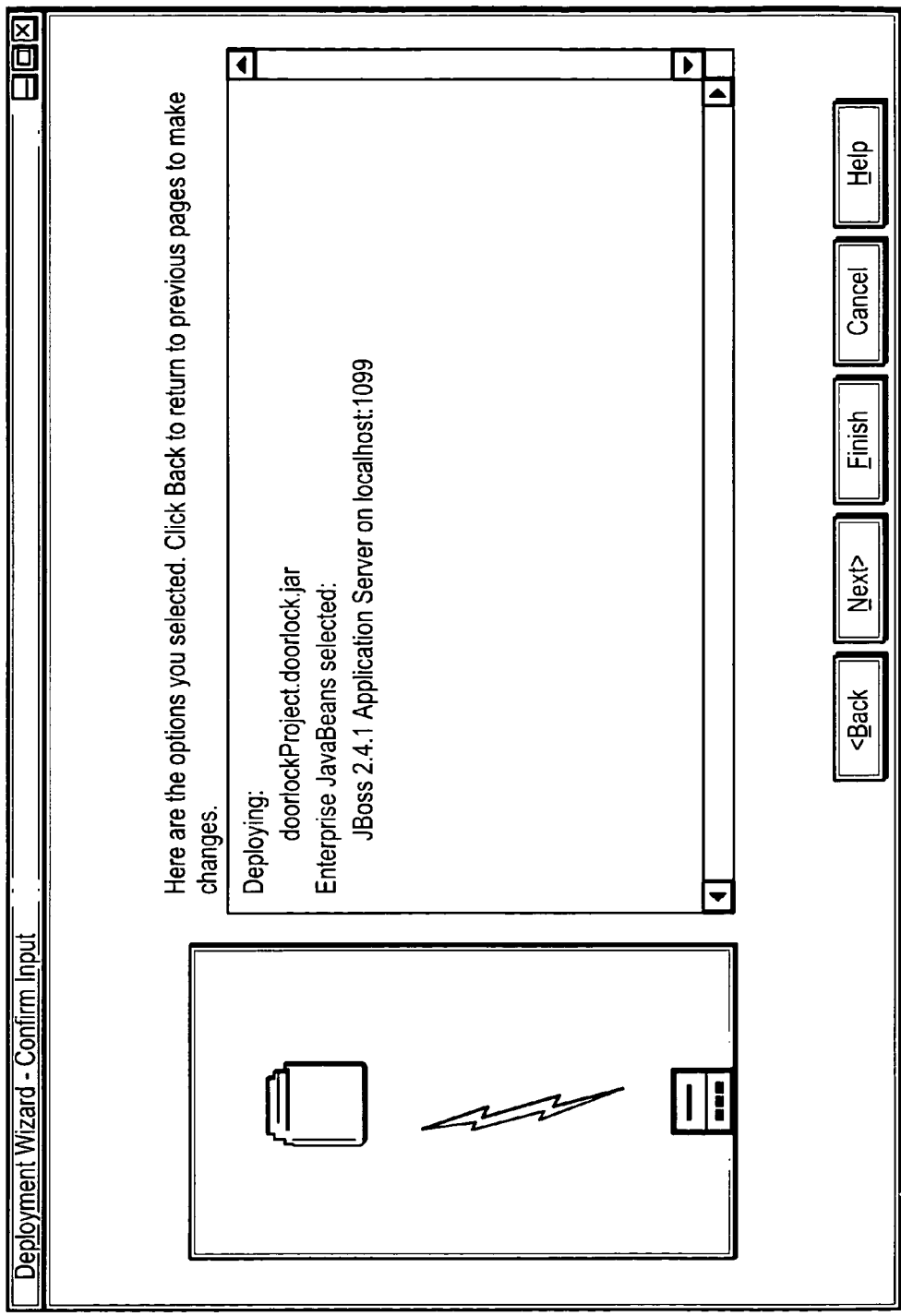
Figure 13:
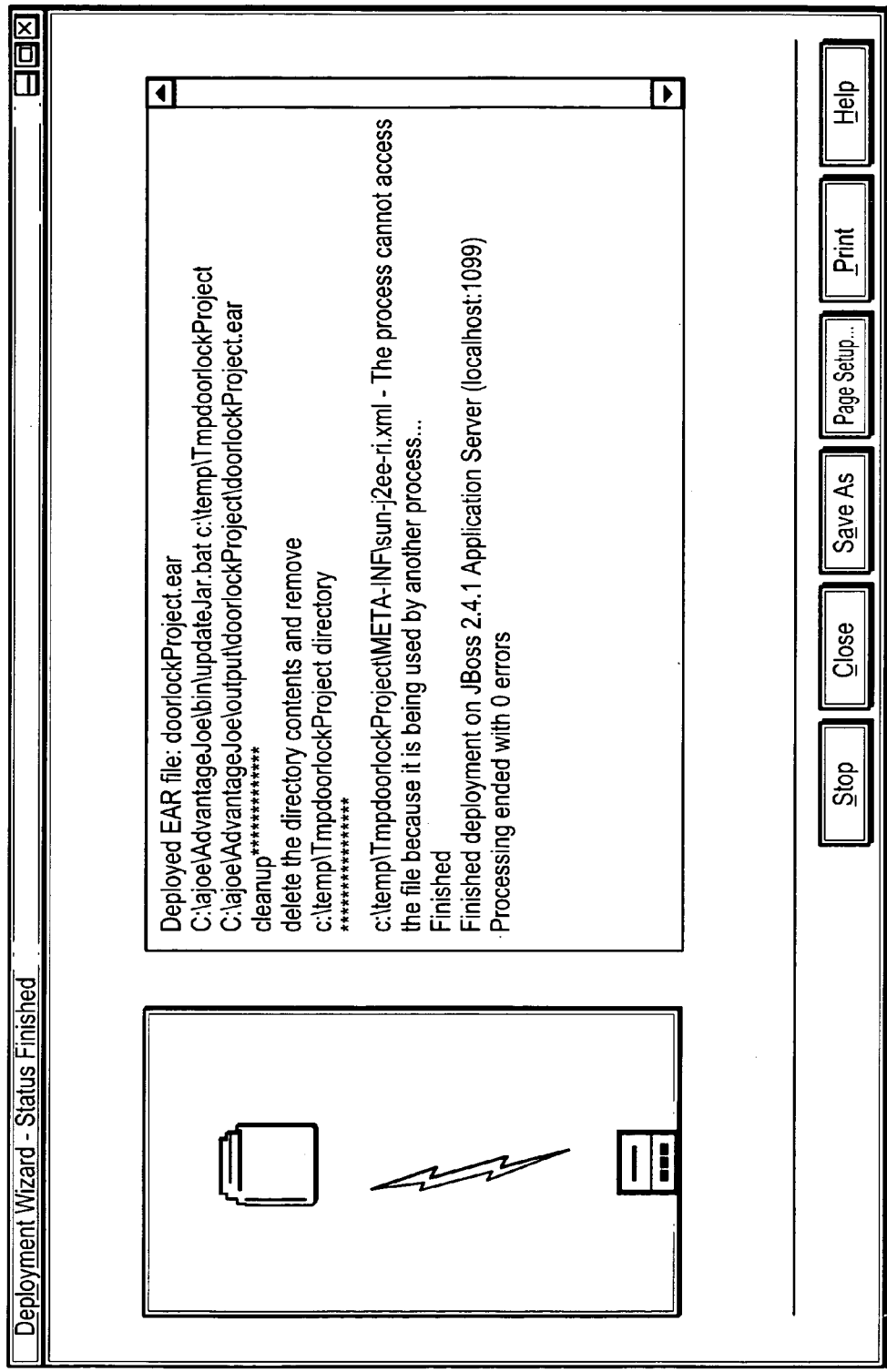

FIG. 12 shows a summary panel in one embodiment. The summary panel allows a user to verify the deployment options before initiating deployment to the target application server. FIG. 13 illustrates a progress panel in one embodiment. The progress panel shows the progress and results of the deployment operations. This panel is optional and may be disabled by the deployment tool.

In one embodiment, the individual plug-ins are isolated from each other. Thus, failures in a particular plug-in typically do not impact other plug-ins. The deployment tool infrastructure described herein is used by the plug-ins to accomplish the deployment of specified EAR files.

The system and method of the present invention may be implemented and run on a general-purpose computer. The deployment tool provided in the present system and method, for example, may be based on EJB 2.0 specification and J2EE 1.3 blueprint. This deployment tool enables deployment of EJBs to various application servers that are, for example, EJB 2.0 compliant and J2EE certified.

The embodiments described above are illustrative examples and it should not be construed as limiting to these particular embodiments. Various changes and modifications may be effected by one skilled in the art without departing from the spirit or scope of the invention as defined in the appended claims. For example, although the system and method disclosed herein has been described with respect to J2EE and Java environment as an example for ease of explanation, it is not limited only to such programming environment. Further, although interfaces and classes defined have been described to explain the operational details of the deployment tool, it should be understood that programming codes may vary. Accordingly, the present invention is not limited except as by the appended claims.

We claim:

1. A system for deploying program modules, comprising:
   a deployment module operable to run in an integrated development environment or in a standalone mode, the deployment module operable to determine a target application server to which to deploy one or more program modules; and
   at least one plug-in module, wherein the at least one plug-in module:
   is dynamically loadable by the deployment module;
   corresponds to at least one application server and at least one program module; and
   encapsulates deployment configurations associated with the at least one program module, the deployment configurations corresponding to the at least one application server.

2. The system of claim 1, wherein the deployment module is operable to provide a user with a list of available target application servers to allow the user to select a target application server.

3. The system of claim 2, wherein the deployment module is operable to allow the user to add a new target application server.

4. The system of claim 3, wherein a new plug-in module associated with the new target application server may be dynamically loaded to run with the deployment module without updating the deployment module.

5. The system of claim 4, wherein the common set of program definitions includes object oriented interface definitions.

6. The system of claim 1, further including a common set of program definitions for the at least one plug-in module to implement for interacting with the deployment module.

7. The system of claim 1, wherein the deployment configurations include one or more platforms on which the at least one application server runs.

8. The system of claim 7, wherein the deployment configurations include information related to the one or more platforms.

9. The system of claim 1, wherein the deployment configurations include a directory structure of the target application server.

10. The system of claim 1, wherein the deployment configurations include security information associated with the at least one application server.

11. The system of claim 1, wherein the deployment configurations include information related to the one or more program modules.

12. A method for deploying program modules, comprising:
    determining a target application server to which to deploy one or more program modules;
    dynamically loading a plug-in module associated with the target application server and the one or more program modules, the plus-in module encapsulating deployment configurations associated with the one or more program modules and the target application server;
    updating a deployment file with the deployment configurations;
    packaging the one or more program modules and the updated deployment file; and
    deploying the packaged one or more program modules to the target application server.

13. The method of claim 12, further including transferring the packaged one or more program modules to the target application server.

14. The method of claim 13, wherein the transferring includes transferring by file transfer protocol (FTP).

15. The method of claim 12, wherein the determining a target application server includes determining a target application server among a plurality of application servers provided by different application server providers.

16. A method for providing a deployment tool for deploying programs to one or more target application servers, comprising:
    providing a deployment module operable to determine a target application server;
    providing a set of common definitions for a plug-in module, wherein:
    the plus-in module corresponds to at least one application server and at least one program module; and
    the plus-in module encapsulates deployment configurations associated with the at least one program module, the deployment configurations corresponding to the at least one application server; and
    the set of common definitions is usable to provide interaction between the deployment module and the plug-in module and also to process deployment configurations for deploying one or more program modules to the at least one application server.

17. The method of claim 16, further comprising:
    providing one or more plug-in modules implementing the set of common definitions, the one or more plug-in modules associated with respective one or more application servers.

18. Logic embodied in a computer readable medium, the computer readable medium comprising code operable to:
    determine a target application server to which to deploy one or more program modules;
    dynamically load a plug-in module associated with the target application server and the one or more program modules, the plug-in module encapsulating deployment configurations associated with the one or more program modules and the target application server;
    update a deployment file with the deployment configurations;
    package the one or more program modules and the updated deployment file; and
    deploy the packaged one or more program modules to the target application, server.

19. A system for deploying one or more program modules to a target application server, comprising:
    a deployment module operable to run in an integrated development environment or in a standalone mode, the deployment module operable to determine a target application server to which to deploy one or more program modules; and
    a common set of program definitions for a plug-in module to implement for interacting with the deployment module, the plug-in module corresponding to the target application server and at least one program module, the common set of program definitions used by the plug-in module and the deployment module to configure target application server specific information for deploying to the target application server.

20. The system of claim 19, further comprising:
    one or more plug-in modules associated with respective one or more target application servers, the one or more plug-in modules implementing the common set of program definitions to determine application server specific configurations associated with respective one or more target application servers.

* * * * *